US012567263B2

(12) United States Patent
Ohmura et al.

(10) Patent No.: US 12,567,263 B2
(45) Date of Patent: Mar. 3, 2026

(54) IMAGING SYSTEM

(71) Applicant: Panasonic Automotive Systems Co., Ltd., Kanagawa (JP)

(72) Inventors: Yohei Ohmura, Kanagawa Ken (JP); Yuji Matsumoto, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/731,883

(22) Filed: Jun. 3, 2024

(65) Prior Publication Data

US 2024/0412527 A1 Dec. 12, 2024

(30) Foreign Application Priority Data

Jun. 7, 2023 (JP) ................................. 2023-094182
Mar. 5, 2024 (JP) ................................. 2024-032641

(51) Int. Cl.
*G06V 20/56* (2022.01)
*G06V 20/59* (2022.01)

(52) U.S. Cl.
CPC .............. *G06V 20/56* (2022.01); *G06V 20/59* (2022.01); *G06V 2201/07* (2022.01)

(58) Field of Classification Search
CPC ..... G06V 20/56; G06V 20/59; G06V 2201/07
See application file for complete search history.

(56) References Cited

U.S. PATENT DOCUMENTS

| | | | | |
|---|---|---|---|---|
| 10,515,535 | B1 * | 12/2019 | Dhullipala Chenchu | .................... G06V 20/59 |
| 2019/0019330 | A1 * | 1/2019 | Miyaoka | ............ G01C 21/3841 |
| 2022/0203935 | A1 * | 6/2022 | Kim | ...................... B60R 25/305 |
| 2022/0266753 | A1 * | 8/2022 | Nakamura | ................ G06T 7/70 |
| 2022/0345669 | A1 * | 10/2022 | McRae | .................. G06V 40/23 |
| 2024/0182046 | A1 * | 6/2024 | Yumoto | .................. H04L 12/28 |

FOREIGN PATENT DOCUMENTS

JP 2021-044661 A 3/2021

* cited by examiner

*Primary Examiner* — Peet Dhillon
(74) *Attorney, Agent, or Firm* — Greenblum & Bernstein, P.L.C.

(57) ABSTRACT

An imaging system include at least one camera, and first to third devices. The at least one camera outputs an image obtained by imaging at least a part of surroundings of a vehicle. The first to third devices include first to third memories storing therein first to third programs, and first to third processors, respectively. The first processor is configured to execute the first program to perform first processing including: detecting an object around the vehicle; and outputting a first instruction to make an instruction to perform second processing in response to detecting the object. The second processor is configured to execute the second program to perform third processing including the second processing. The third processor is configured to execute the third program to perform fourth processing including outputting an image received from the second device and output by the at least one camera.

10 Claims, 14 Drawing Sheets

FIG.13

IMAGING SYSTEM

CROSS-REFERENCE TO RELATED APPLICATIONS

This application is based upon and claims the benefit of priority from Japanese Patent Application No. 2023-094182, filed on Jun. 7, 2023 and Japanese Patent Application No. 2024-032641, filed on Mar. 5, 2024, the entire contents of which are incorporated herein by reference.

FIELD

The present disclosure relates to an imaging system.

BACKGROUND

There is known a technique of imaging and recording an image of the inside and outside of a vehicle by a camera or the like attached to a vehicle body (for example, JP 2021-44661 A). In the technique according to the related art as described above, when a moving object is detected around the vehicle, imaging by the camera or the like is started in accordance with the detection, and further, storage (in other words, video recording) of data output from the camera is started.

However, when imaging or video recording is performed in accordance with detection of an object as in the technique according to the related art, a load on an in-vehicle battery is large, and a capacity of a memory for storing data is used up. For this reason, there is a possibility that an evidence video for proving a crime is overwritten and erased due to a limited memory capacity, or the battery runs out at a timing when the evidence video needs to be taken.

In addition, the technique according to related art does not provide a technique for an owner of the vehicle to know that an object is detected at the time of object detection. Therefore, for example, in a case where the vehicle is stolen, even if the evidence video is recorded, it would be meaningless.

The present disclosure has an object to provide an imaging system that can enhance security of a vehicle.

SUMMARY

An imaging system according to the present disclosure include at least one camera, a first device, a second device, and a third device. The at least one camera outputs an image obtained by imaging at least a part of surroundings of a vehicle. The first device includes a first memory storing therein a first program, and a first processor coupled to the first memory. The second device including a second memory storing therein a second program, and a second processor coupled to the second memory. The third device including a third memory storing therein a third program, and a third processor coupled to the third memory. The first processor is configured to execute the first program to perform first processing. The first processing includes: detecting an object around the vehicle; and outputting a first instruction to make an instruction to perform second processing in response to detecting the object. The second processor is configured to execute the second program to perform third processing including the second processing. The third processor is configured to execute the third program to perform fourth processing. The fourth processing includes outputting an image received from the second device and output by the at least one camera.

BRIEF DESCRIPTION OF THE DRAWINGS

FIG. 13 is a sequence diagram illustrating an example of a flow of processing executed by the notification system;

DETAILED DESCRIPTION

A first embodiment will be described with reference to the drawings.

Configuration Example of Vehicle

Figure 1:
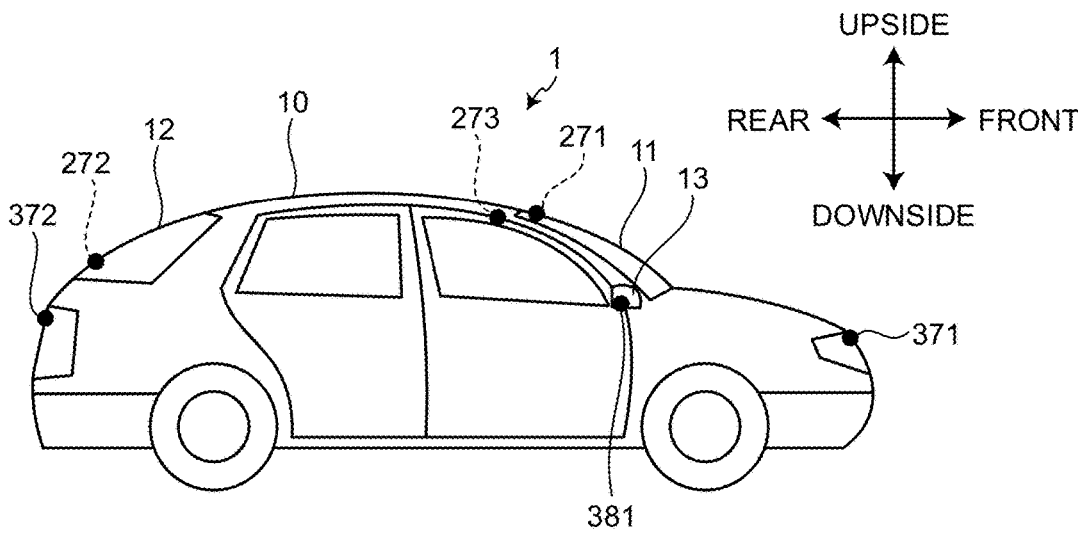
FIG. 1 is a view schematically illustrating an example of a vehicle according to an embodiment.
Figure 2:
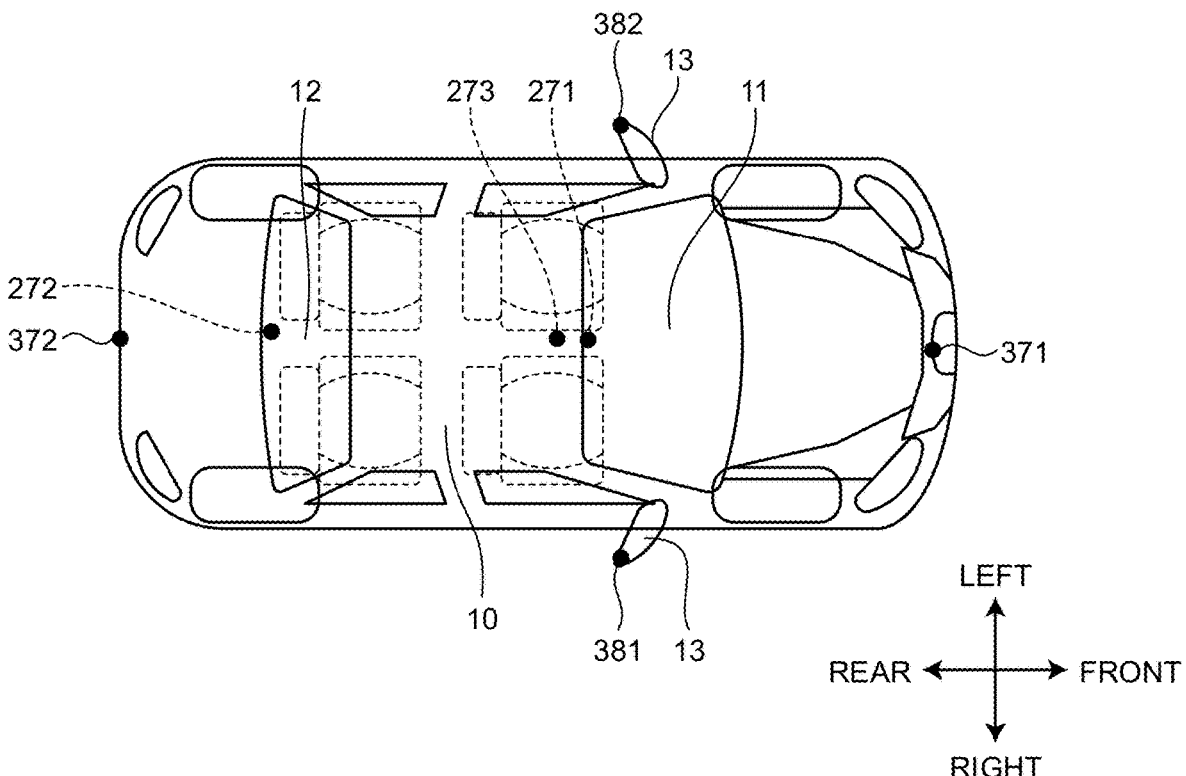
FIG. 2 is a view schematically illustrating an example of the vehicle according to the embodiment.

FIGS. 1 and 2 are views schematically illustrating an example of a vehicle 1 according to an embodiment, in which FIG. 1 is a right side view and FIG. 2 is a plan view. The vehicle 1 according to the present embodiment includes a vehicle body 10, a windshield 11, a rear glass 12, and a pair of left and right side mirrors 13. Furthermore, a front camera 271 and a rear camera 272 that images the vehicle outside, and an interior camera 273 that images the vehicle inside are provided in the vehicle 1. Here, the vehicle outside means the outside of the vehicle 1, and the vehicle inside means the inside of the vehicle 1. Furthermore, a front side camera 371, a rear side camera 372, a right side camera 381, and a left side camera 382 that image the surroundings of the vehicle 1. The cameras 271 to 273, 371, 372, 381, and 382 described above are an example of an imaging unit that outputs an image obtained by imaging at least a part of the surroundings of the vehicle. Further, the cameras 271 to 273, 371, 372, 381, and 382 described above are an example of at least one camera that outputs an image obtained by imaging at least part of the surroundings of the vehicle.

Here, the at least the part of the surroundings of the vehicle means a part of an area to be detected (or an area to be monitored) set around the vehicle, and the at least one camera is constructed to be capable of capturing an image imaging the whole of the area to be detected (or the area to be monitored), as a whole.

The front camera 271 is disposed inside the vehicle 1 (in other words, inside a compartment) at an upper portion of the windshield 11, and images the outside of the windshield 11, that is, an area in front of the vehicle 1. The rear camera 272 is disposed inside the vehicle compartment at a lower portion of the rear glass 12, and images the outside of the rear glass 12, that is, an area in the rear of the vehicle 1. The interior camera 273 is disposed on a ceiling of the vehicle compartment in the vicinity of the windshield 11, and images the interior of the vehicle.

The cameras 371, 372, 381, and 382 for imaging the surroundings of the vehicle 1 are wide-angle cameras, and image areas below attachment positions thereof at a wide angle. In other words, the cameras 371, 372, 381, and 382 are downward imaging cameras that images areas below attachment positions thereof. The front side camera 371 is disposed at a front portion of the vehicle body 10. The rear side camera 372 is disposed at a rear portion of the vehicle body 10. The right side camera 381 is disposed on the right side mirror 13. The left side camera 382 is disposed on the left side mirror 13.

In this case, more preferably, an imaging area of the front side camera 371 partially overlaps an imaging area of the right side camera 381 and an imaging area of the left side camera 382, and an imaging area of the rear side camera 372 partially overlaps the imaging area of the right side camera 381 and the imaging area of the left side camera 382. As a result, the whole circumference of the vehicle can be imaged without a blind angle.

Configuration Example of Notification System

Figure 3:
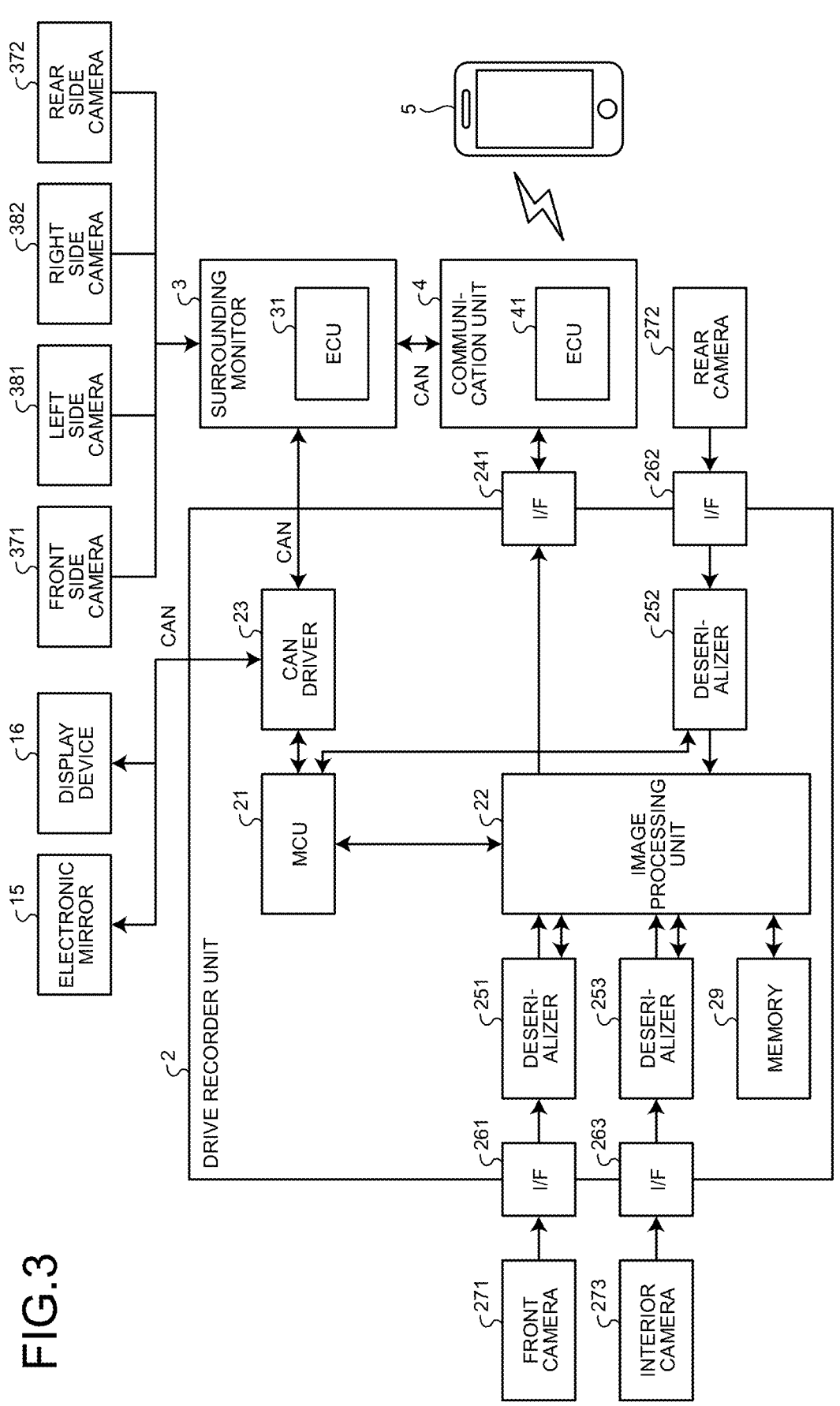
FIG. 3 is a block diagram illustrating an example of a configuration of a notification system according to an embodiment.

FIG. 3 is a block diagram illustrating an example of a configuration of a notification system. The notification system according to the present embodiment includes a drive recorder unit 2, a surrounding monitor 3, and a communication unit 4. The communication unit 4 is an example of a notification device. The vehicle 1 further includes an electronic mirror 15 and a display device 16. Each of the drive recorder unit 2, the surrounding monitor 3, and the communication unit 4 is an example of any of a first device, a second device, and a third device.

The drive recorder unit 2 includes a micro controller unit (MCU) 21, an image processing unit 22, a CAN driver 23, interfaces (I/Fs) 241 and 261 to 263, deserializers 251 to 253, a memory 29, and the like. The surrounding monitor 3 includes an electronic control unit (ECU) 31 and the like. The communication unit 4 includes an ECU 41 and the like.

The MCU 21 integrally controls units of the drive recorder unit 2. The ECU 31 integrally controls units of the surrounding monitor 3. The ECU 41 integrally controls units of the communication unit 4. In addition, the MCU 21 and the ECUs 31 and 41 execute software programs included in a memory, to implement various functional units (see FIG. 4 described below) as control units 20, 30, and 40.

The image processing unit 22 is implemented by, for example, a system on a chip (SOC), and executes image processing of videos or images imaged by the cameras 271 to 273. In addition, the image processing unit 22 transfers video signals received from the deserializers 251 to 253 to the communication unit 4 via the I/F 241. Data communication related to the transfer is performed by, for example, Ethernet (registered trademark). Hereinafter, a video and an image may be referred to as "video" or "image" without distinguishing them from each other.

The CAN driver 23 mediates serial communication between the MCU 21 and other devices according to a controller area network (CAN) protocol. The CAN driver 23 and the surrounding monitor 3, the surrounding monitor 3 and the communication unit 4, and the CAN driver 23, the electronic mirror 15, and the display device 16 are connected by wire.

The I/F 241 and the I/Fs 261 to 263 connect the communication unit 4 and the cameras 271 to 273 to the deserializers 251 to 253, and mediate communication between the communication unit 4 and the cameras 271 to 273 and the image processing unit 22.

Upon receiving a control signal from the image processing unit 22, the deserializers 251 to 253 receive videos transmitted from the cameras 271 to 273. At this time, the deserializers 251 to 253 convert the videos transmitted as serialized video signals into parallel data. The deserializers 251 to 253 transmit parallelized videos as video signals to the image processing unit 22. The deserializers 251 to 253 are an example of a receiving unit.

The drive recorder unit 2 is housed in, for example, a console box of the vehicle 1. The drive recorder unit 2 records (in other words, video recording) videos or images imaged by the front camera 271, the rear camera 272, and the interior camera 273 by storing (in other words, saving) the videos or images in the memory 29. The memory 29 is a storage device such as a micro SD, an embedded multi media card (eMMC), or a solid state drive (SSD). The drive recorder unit 2 may record videos or images imaged by the front side camera 371, the rear side camera 372, the right side camera 381, and the left side camera 382 described later and received from the surrounding monitor 3 described later, by storing them in the memory 29.

The surrounding monitor 3 is housed in, for example, the console box of the vehicle 1. The surrounding monitor 3 outputs videos or images imaged by the front side camera 371, the rear side camera 372, the right side camera 381, and the left side camera 382. In addition, the surrounding monitor 3 combines the videos of the front side camera 371, the rear side camera 372, the right side camera 381, and the left side camera 382, and outputs bird's-eye view videos or the like of the vehicle 1 and the surrounding thereof.

The communication unit 4 enables data communication with an external device (for example, a user terminal 5) using an LTE communication network, a wireless local area network (LAN), or the like.

The electronic mirror 15 is implemented by a display device such as a liquid crystal display. The electronic mirror 15 serves as a mirror for checking the rear of the vehicle 1 by projecting a video of the rear of the vehicle 1 imaged by the rear camera 272.

The display device 16 is, for example, a display device such as a panel-type liquid crystal display fitted in an instrument panel or the like. The display device 16 displays a video or the like processed by the surrounding monitor 3 or the drive recorder unit 2.

The electronic mirror 15 and the display device 16 receive and display a video transmitted from the drive recorder unit 2 (or the rear camera 272) or the surrounding monitor 3.

Figure 4:
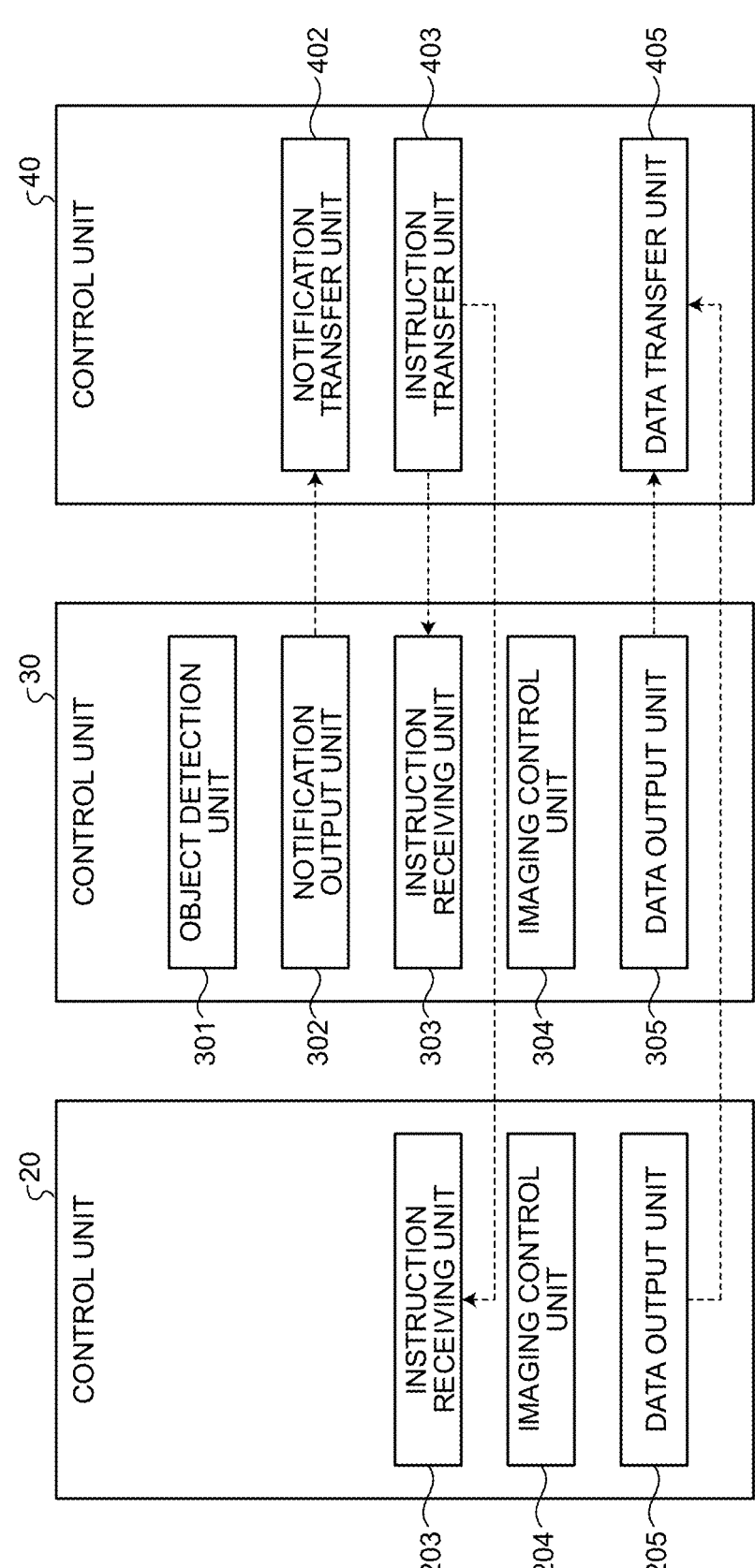
FIG. 4 is a block diagram illustrating an example of functional units included in control units.

FIG. 4 is a block diagram illustrating an example of functional units included in the control units 20, 30, and 40. The control unit 30 of the surrounding monitor 3 includes an object detection unit 301, a notification output unit 302, an instruction receiving unit 303, an imaging control unit 304, a data output unit 305, and the like. The control unit 20 of the drive recorder unit 2 includes an instruction receiving unit 203, an imaging control unit 204, a data output unit 205, and the like. The control unit 40 of the communication unit 4 includes a notification transfer unit 402, an instruction transfer unit 403, a data transfer unit 405, and the like.

The object detection unit 301 detects an object moving within one or more detection ranges around the vehicle 1. In other words, the object detection unit 301 executes a detection process of detecting an object around the vehicle. In a case where a moving object is reflected in images output from the cameras 371, 372, 381, and 382, the object detection unit 301 outputs a signal (detection signal) indicating that the object has been detected. The signal indicating that the object has been detected may be referred to as a detection signal.

The notification output unit 302 is an example of a notification unit that outputs a detection notification corresponding to information to make notification that an object has been detected by the object detection unit 301 to an external device (for example, the user terminal 5). In other words, the notification unit executes a notification process of outputting, to the external device (for example, the user terminal 5), the detection notification corresponding to the information to make notification that an object has been detected by the object detection unit 301. In a case where the object detection unit 301 outputs the detection signal, the notification output unit 302 notifies the communication unit 4 of the detection notification indicating that. In the present embodiment, the notification output unit 302 constitutes, together with the notification transfer unit 402, the notification unit. The notification output unit 302 may output, to the drive recorder unit 2, an imaging instruction to make an instruction to perform imaging by at least one camera, in response to an object being detected by the object detection unit 301. The notification output unit 302 is an example of an instruction output unit.

In a case where an instruction transferred by the communication unit 4 is received, the instruction receiving unit 303 receives the instruction and executes processing according to the instruction. Examples of the processing include transfer of an instruction to the drive recorder unit 2, transmission of an instruction to the imaging control unit 304, and storage of a setting as to whether or not to operate the cameras 371, 372, 381, and 382 at the time of parking.

The imaging control unit 304 performs control such as instructing the cameras 371, 372, 381, and 382 to start or end imaging.

The data output unit 305 outputs data of videos imaged by the cameras 371, 372, 381, and 382 to the communication unit 4.

In a case where an instruction transferred by the communication unit 4 is received via the instruction receiving unit 303, the instruction receiving unit 203 receives the instruction and executes processing according to the instruction. Examples of the processing include transmission of an instruction to the imaging control unit 204 and storage of a setting as to whether or not to operate the cameras 271 to 273 at the time of parking.

The imaging control unit 204 performs control such as instructing the cameras 271 to 273 to start or end imaging.

The data output unit 205 outputs data of videos imaged by the cameras 271 to 273 to the communication unit 4. The data output unit 205 is an example of an output unit. Further, the data output unit 205 is an example of an image output unit.

The notification transfer unit 402 is an example of a notification unit that outputs the detection notification corresponding to the information to make notification that an object has been detected by the object detection unit 301 to an external device (for example, the user terminal 5). The notification transfer unit 402 transfers the detection notification received from the surrounding monitor 3 to a predetermined external device (for example, the user terminal 5).

The instruction transfer unit 403 is an example of a reception unit that receives an instruction related to the start of imaging of at least a part of the surroundings of the vehicle 1 from an external device (for example, the user terminal 5) after the notification output unit 302 and the notification transfer unit 402 (in other words, the notification unit) output a notification to the external device. The instruction related to the start of imaging of at least a part of the surroundings of the vehicle 1 is, in other words, an instruction to start imaging by at least one camera. The instruction transfer unit 403 transfers an instruction received from an external device (for example, the user terminal 5) to the surrounding monitor 3.

The data transfer unit 405 transfers data received from the surrounding monitor 3 and the drive recorder unit 2 to a predetermined external device (for example, the user terminal 5).

In the first embodiment, the instruction transfer unit 403, the instruction receiving units 303 and 203, the imaging control units 304 and 204, the data output units 305 and 205, and the data transfer unit 405 function as a control unit that executes the following processes in cooperation. That is, the instruction transfer unit 403, the instruction receiving units 303 and 203, the imaging control units 304 and 204, the data output units 305 and 205, and the data transfer unit 405 do not immediately start imaging by an imaging unit (at least some of the cameras 271 to 273, 371, 372, 381, and 382) even in a case where an object is detected by the object detection unit 301, but execute a process of starting imaging by the imaging unit according to an instruction related to the imaging by the imaging unit when the instruction is received from an external device (the user terminal 5) after the notification unit (at least one of the notification output unit 302 and the notification transfer unit 402) outputs the detection notification. In other words, the instruction transfer unit 403, the instruction receiving units 303 and 203, the imaging control units 304 and 204, the data output units 305 and 205, and the data transfer unit 405 cooperate to execute an imaging start process of starting imaging by at least one camera according to the instruction related to the imaging by the imaging unit according to the instruction related to the imaging by the ate least one camera, when receiving the instruction from the external device. Not all the instruction transfer unit 403, the instruction receiving units 303 and 203, the imaging control units 304 and 204, the data output units 305 and 205, and the data transfer unit 405 cooperate, but at least two of them may cooperate to function as the control unit.

Figure 5:
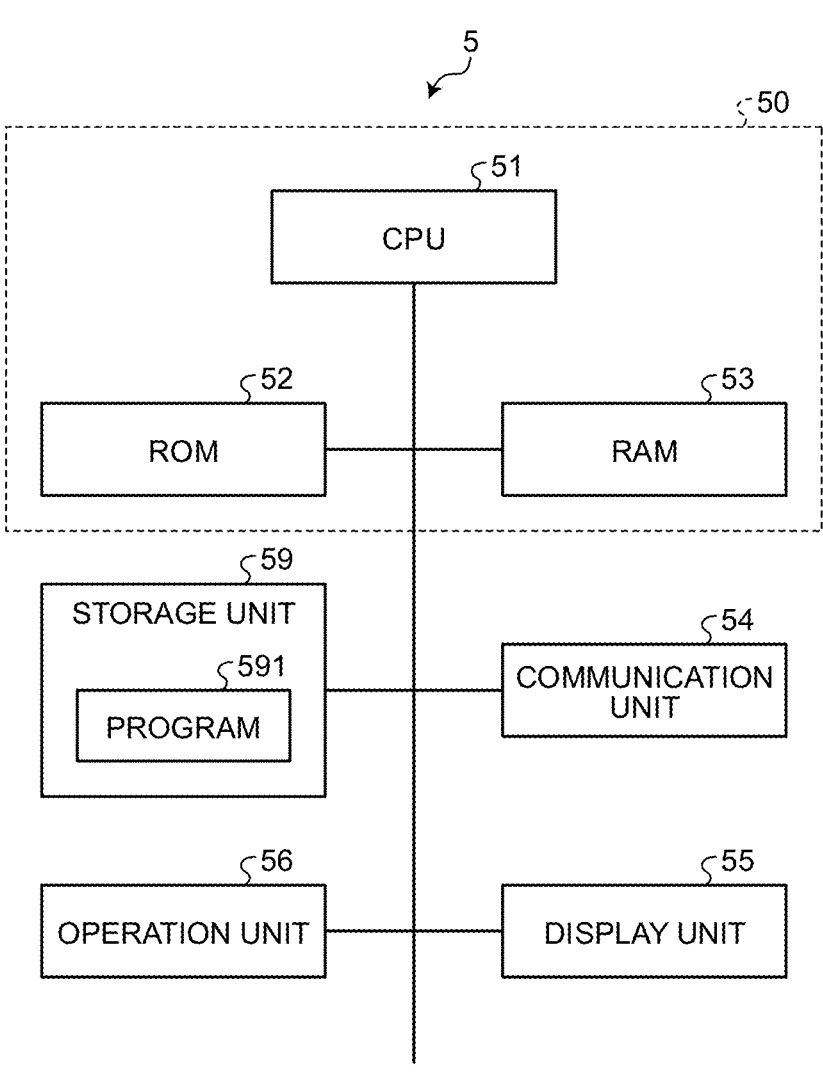
FIG. 5 is a block diagram illustrating an example of a configuration of a user terminal.

FIG. 5 is a block diagram illustrating an example of a configuration of the user terminal 5. The user terminal 5 is, for example, a smartphone or a tablet-type terminal device. A user who possesses the user terminal 5 is a user of the notification system according to the present embodiment, and is, for example, an owner (in other words, an possessor) of the vehicle 1.

The user terminal 5 includes a central processing unit (CPU) 51, a read only memory (ROM) 52, a random access memory (RAM) 53, a communication unit 54, a display unit 55, an operation unit 56, a storage unit 59, and the like.

The CPU 51 is an example of a processor, and integrally controls units of the user terminal 5. The ROM 52 stores various programs. The RAM 53 is a work space for deploying programs and various data. The CPU 51, the ROM 52, and the RAM 53 are connected via a bus or the like, and constitute a control unit 50 having a computer configuration.

The communication unit 54 is a communication interface that communicably connects the control unit 50 and an external device (for example, the communication unit 4).

The display unit 55 includes a display device such as a liquid crystal display (LCD), and displays various types of information under the control of the CPU 51. The operation unit 56 includes an input device such as a touch panel provided to overlap the surface of the display unit 55, and outputs an operation content input via the input device to the CPU 51.

Further, the user terminal 5 may include a sound output unit such as a speaker or a buzzer and output a sound under the control of the CPU 51.

The storage unit 59 includes a storage medium such as a solid state drive (SSD) or a flash memory, and maintains a stored content even when a power supply is turned off. The storage unit 59 stores a program executable by the CPU 51 and various types of setting information. In addition, the program stored in the storage unit 59 also includes a program 591 that implements a dedicated application (application program) corresponding to the notification system according to the present embodiment.

The control unit 50 executes various types of processing by the CPU 51 operating according to a program stored in the ROM 52 or the storage unit 59 and deployed in the RAM 53. As a result, the control unit 50 implements various functional units (see FIG. 6 described below).

Figure 6:
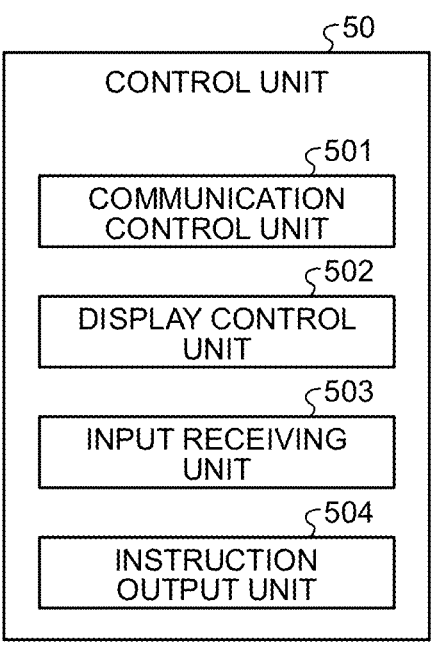
FIG. 6 is a block diagram illustrating an example of functional units included in a control unit.

FIG. 6 is a block diagram illustrating an example of functional units included in the control unit 50. The control unit 50 of the user terminal 5 includes a communication control unit 501, a display control unit 502, an input receiving unit 503, an instruction output unit 504, and the like.

The communication control unit 501 controls communication between the user terminal 5 and an external device (for example, the communication unit 4) via the communication unit 54. The display control unit 502 controls a display content of the display unit 55.

The input receiving unit 503 receives an operation content input via the input device described above. The operation content is, for example, an instruction to the notification system (more specifically, the surrounding monitor 3 and the drive recorder unit 2). The instruction output unit 504 outputs the above-described instruction to the communication unit 4.

Figure 7:
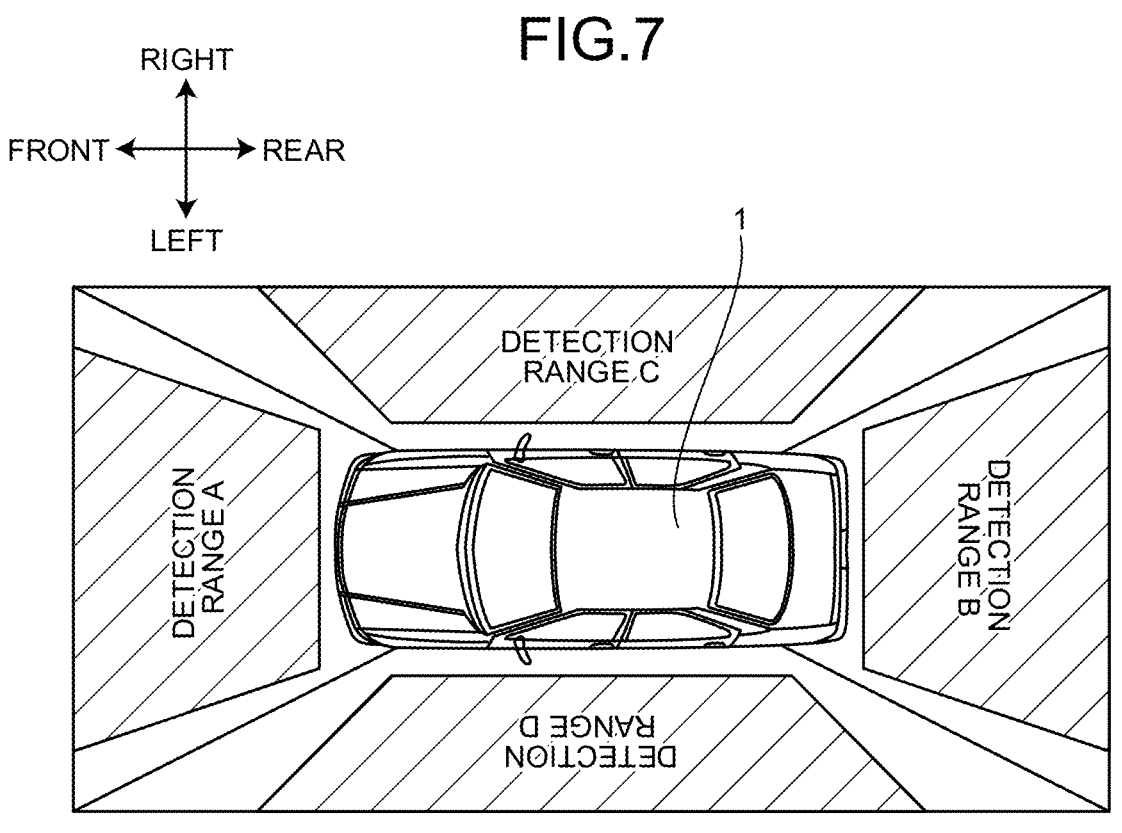
FIG. 7 is a view illustrating an example of detection ranges of a surrounding monitor.

FIG. 7 is a diagram illustrating an example of the detection ranges of the surrounding monitor 3. Detection ranges A, B, C, and D of the surrounding monitor 3 correspond to ranges whose images are imaged by the front side camera 371, the rear side camera 372, the right side camera 381, and the left side camera 382, respectively.

Here, a condition for performing the notification by the notification transfer unit 402 is set in advance. The setting has a default value, and the default value may be changeable appropriately. The change of the setting can be received via an external device (for example, the user terminal 5). The setting is stored in the communication unit 4, for example. The setting may be stored in the surrounding monitor 3, the drive recorder unit 2, or the user terminal 5.

Conditions for performing the notification by the notification transfer unit 402 include, for example, the following.

Condition 1: The number of times object detection is performed by surrounding monitor 3 until the notification is made once Condition 2: A time zone in which object detection or notification is made by the surrounding monitor 3

Condition 1 is preferably used, for example, in a case where a parking location of the vehicle 1 is a location with pedestrian traffic at a high level. In such a case, it is expected that the number of times object detection is performed is increased. For this reason, in a case where the notification is made every time detection is performed, there is a possibility that the frequency of the notification becomes too high. In such a case, the number of times object detection is performed by the surrounding monitor 3 until the notification is made once is set to, for example, 10 times. By doing so, control can be performed to make the notification when object detection is performed 10 times.

For example, in a case where the parking location is a location with pedestrian traffic at or below a normal level unlike the above case, it is preferable to set the number of times object detection is performed by surrounding monitor 3 until the notification is made once, to be small (for example, once).

Condition 2 is used for, for example, performing the notification only at night because the owner is at home in daytime, not performing object detection and notification when the vehicle is parked in a garage at home, and performing object detection and notification only when using a parking lot outside the home, such as when the user is out of the house.

Further, the number of times object detection is performed by surrounding monitor 3 until the notification is made once can be set depending on the hour.

In addition, in addition to Conditions 1 and 2 described above, the following can also be set in advance.

Condition 3: Selection and designation of a detection range to be an object detection target of the surrounding monitor 3

Condition 4: Selection and designation of an imaging unit (the cameras 271 to 273 and 371, 372, 381, and 382) to be operated according to an instruction of the user terminal 5

Figure 8:
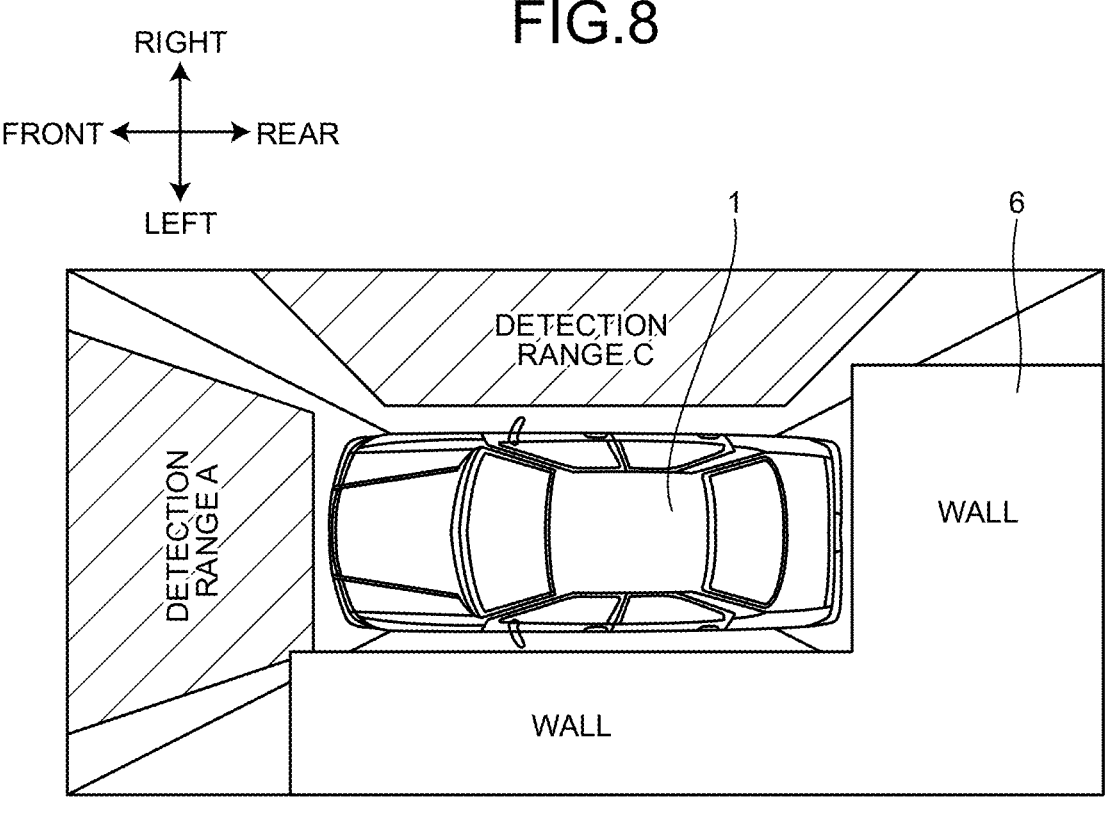
FIG. 8 is a view illustrating an example of detection ranges in a case where there are walls behind and on a left side of the parked vehicle.

Here, FIG. 8 is a view illustrating an example of the detection ranges in a case where there are walls 6 behind and on a left side of the parked vehicle 1. For example, in a case where the vehicle 1 is parked in a parking location as illustrated in FIG. 8, the rear side and the left side of the vehicle 1 are protected by the walls 6, and thus, object detection in the detection ranges B and D is unnecessary. Therefore, in such a case, only the detection ranges A and C can be selected as the object detection targets. That is, in such a case, the front side camera 371 and the right side camera 381 (or the front camera 271) are selected as the imaging units to be operated.

In addition to Conditions 1 to 4 described above, the following can also be set in advance.

Condition 5: Whether or not it is necessary to record an image output from the designated imaging unit in association with the start of imaging Note that a default value of Condition 5 described above may be "No". That is, image data output from the imaging unit is not started to be stored in the memory 29 at the start of imaging.

Similarly to Conditions 1 and 2, Conditions 3 to 5 have default values, and the values may be changeable appropriately. The change of the setting can be received via an external device (for example, the user terminal 5). The setting is stored in the communication unit 4, for example. The setting may be store in the surrounding monitor 3, the drive recorder unit 2, or the user terminal 5.

Figure 9:
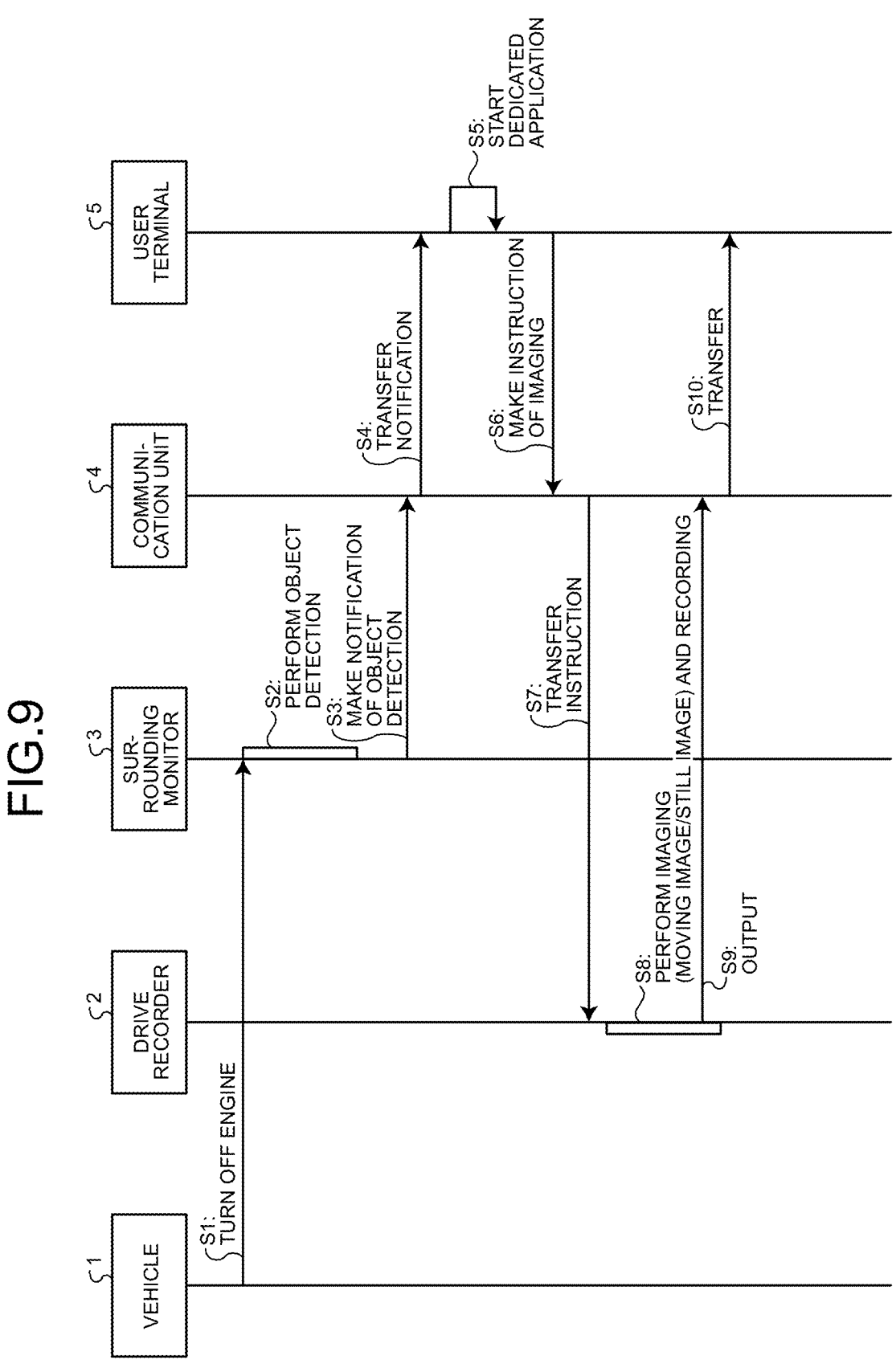
FIG. 9 is a sequence diagram illustrating an example of a flow of processing executed by the notification system.

In such a configuration, the notification system according to the present embodiment executes processing in the following exemplified flow. FIG. 9 is a sequence diagram illustrating an example of a flow of processing executed by the notification system.

First, when the vehicle 1 turns off an engine (OFF) (step S1), power supply to each unit of the vehicle 1 is substantially stopped, but the surrounding monitor 3 is operated by receiving power supplied from a battery included in the vehicle 1, and the control unit 30 (specifically, the object detection unit 301) performs object detection (step S2).

When a motion of an object is detected in a designated detection range, the control unit 30 outputs the detection notification corresponding to information indicating that an object has been detected to the communication unit 4 (step S3). Providing additional details on the information transmission here, the output of the notification from the surrounding monitor 3 to the communication unit 4 is performed through the CAN (that is, wired communication).

Upon receiving the detection notification, the control unit 40 of the communication unit 4 transfers the notification to the user terminal 5 (step S4). Providing additional details on the information transmission here, the transmission of the notification from the communication unit 4 to the user terminal 5 is performed through, for example, an LTE line (that is, wireless data communication). The notification system according to the present embodiment warns the user of theft or the like of the vehicle 1 by the above-described notification, and asks for an instruction for crime prevention.

Upon receiving the notification, the control unit 50 of the user terminal 5 causes the display unit 55 to display a banner displaying a content of the notification. At this time, the control unit 50 may operate the speaker or the like included in the user terminal 5 to emit a notification sound or the like. Further, if the user terminal 5 is in a screen lock state, the control unit 50 may make the notification by displaying a pop-up window on the lock screen.

The user terminal 5 starts a dedicated application in response to a user operation for the displayed notification (step S5). The control unit 50 that executes the dedicated application causes the display unit 55 to display a screen including details of a notification content and an operator for receiving various instructions from the user. Examples of the operator include an operator for instructing the start of imaging or recording by the imaging unit and an operator for selecting a camera to be operated.

When the operation unit 56 receives an operation on the operator, the control unit 50 transmits the received instruction to the communication unit 4 (step S6).

Upon receiving the instruction from the user terminal 5, the communication unit 4 transfers the instruction to the drive recorder unit 2 (step S7).

Upon receiving the above instruction, the drive recorder unit 2 starts imaging with at least some of the cameras 271 to 273 (step S8). The camera to be operated is set in advance. In a default setting, recording is not performed at this timing.

The drive recorder unit 2 outputs video data output from the designated camera to the communication unit 4 (step S9). The video data output here is preferably not a recoded video but a real-time video.

When the video data is input from the drive recorder unit 2, the communication unit 4 transfers the video data to the user terminal 5 (step S10).

Upon receiving the video data from the communication unit 4, the user terminal 5 reproduces the video data by the dedicated application. Along with the reproduction, the dedicated application causes the display unit 55 to display a screen including an operator for receiving an operation for instructing storage of the video data, and the operation unit

56 receives an operation on the operator. Upon receiving the operation on the operator, the user terminal 5 transmits the instruction to the communication unit 4. The communication unit 4 having received the instruction transfers the instruction to the drive recorder unit 2. The drive recorder unit 2 having received the instruction stores the video data output from the designated imaging unit in the memory 29.

The object detection and the notification (steps S2 to S4) described above are performed according to the provision of Conditions 1 to 4. Whether or not to store (in other words, video record) the video data output from the designated camera (step S8) is also set in advance.

According to such an embodiment, the notification system performs the notification to the owner of the vehicle 1 via the user terminal 5, so that it is possible to warn of a possibility of harm to the vehicle 1. Furthermore, the notification system can avoid consumption of the capacity of the memory 29 and the remaining battery capacity due to recording immediately performed when an object is detected. As a result, it is possible to prevent an evidence image stored in the memory 29 from being erased by overwriting due to recording undesired by the user. Furthermore, the notification system can receive an instruction from the user who has received the notification, and store image data output from the imaging unit when the user determines that it is necessary. As a result, an appropriate evidence image can be left in the memory 29. As described above, according to the present embodiment, security of the vehicle 1 can be enhanced.

Furthermore, in the notification system according to the present embodiment, a person approaching the vehicle 1 can be easily detected by using the cameras 371, 372, 381, and 382 for the surrounding monitor 3 for object detection, and it is not necessary to add a separate device.

In addition, in the notification system according to the present embodiment, the cameras 271 to 273 for the drive recorder unit 2 are used for imaging and recording after the user terminal 5 is notified of the object detection, so that it is possible to easily image and record an image of the face of the person approaching the vehicle 1.

In the present embodiment, the drive recorder unit 2, the surrounding monitor 3, and the communication unit 4 are illustrated as separate devices. However, actual implementation is not limited to this example, and for example, two or more of the drive recorder unit 2, the surrounding monitor 3, and the communication unit 4 may be included in the same device. In this case, the various functional units described in the present embodiment may be implemented by a common ECU.

Furthermore, a case where the user has not noticed (or has noticed late) the notification displayed by the user terminal 5 will be described. In a case where a reaction to the notification is not returned from the user terminal 5 even after a predetermined time has elapsed since the notification system outputs the notification, the notification system is operated, for example, as in the following (1) to (3) according to a predetermined setting.

In a case where a predetermined time has elapsed from the notification output and no instruction is received, the notification system performs an operation of:

(1) entering a sleep state, (2) storing image data output from an imaging unit satisfying Conditions 3 and 4 in the memory 29 even if the set value of Condition 5 is "no", or (3) making the notification again.

The setting of the operation exemplified in the above (1) to (3) has a default value as in Conditions 1 to 5, and a change of the value is received from the user terminal 5 or the like.

Furthermore, in the present embodiment, the object detection unit is implemented by the control unit 30 of the surrounding monitor 3, and performs object detection based on the outputs of the cameras 371, 372, 381, and 382, but the present disclosure is not limited thereto. For example, the object detection unit may perform object detection using a sonar instead of the camera.

Further, in the first embodiment, the restriction of the notification according to Condition 1 or the like on the vehicle 1 side (for example, the communication unit 4) is more effective in suppressing the consumption of the battery included in the vehicle 1 than the restriction performed by the user terminal 5. Although it is also possible to limit the frequency of the notification by the dedicated application of the user terminal 5, it is preferable to reduce the number of times the notification is made by the notification system because power saving can be achieved by refraining from communication.

Furthermore, in actual implementation, an operation for ending detection by the surrounding monitor 3 may be received from the user by displaying an operator on the user terminal 5 or the like. In addition, the dedicated application may be configured to display an operator for receiving this operation on the user terminal 5 in a case where the number of times the notification is made during a predetermined time exceeds a threshold.

Next, a modified example of the embodiment will be described.

A second embodiment will be described with reference to FIG. 10. Since the second embodiment is a modified example of the first embodiment, the explanation of the same parts as those of the first embodiment is omitted and the same reference numerals will be used.

Figure 10:
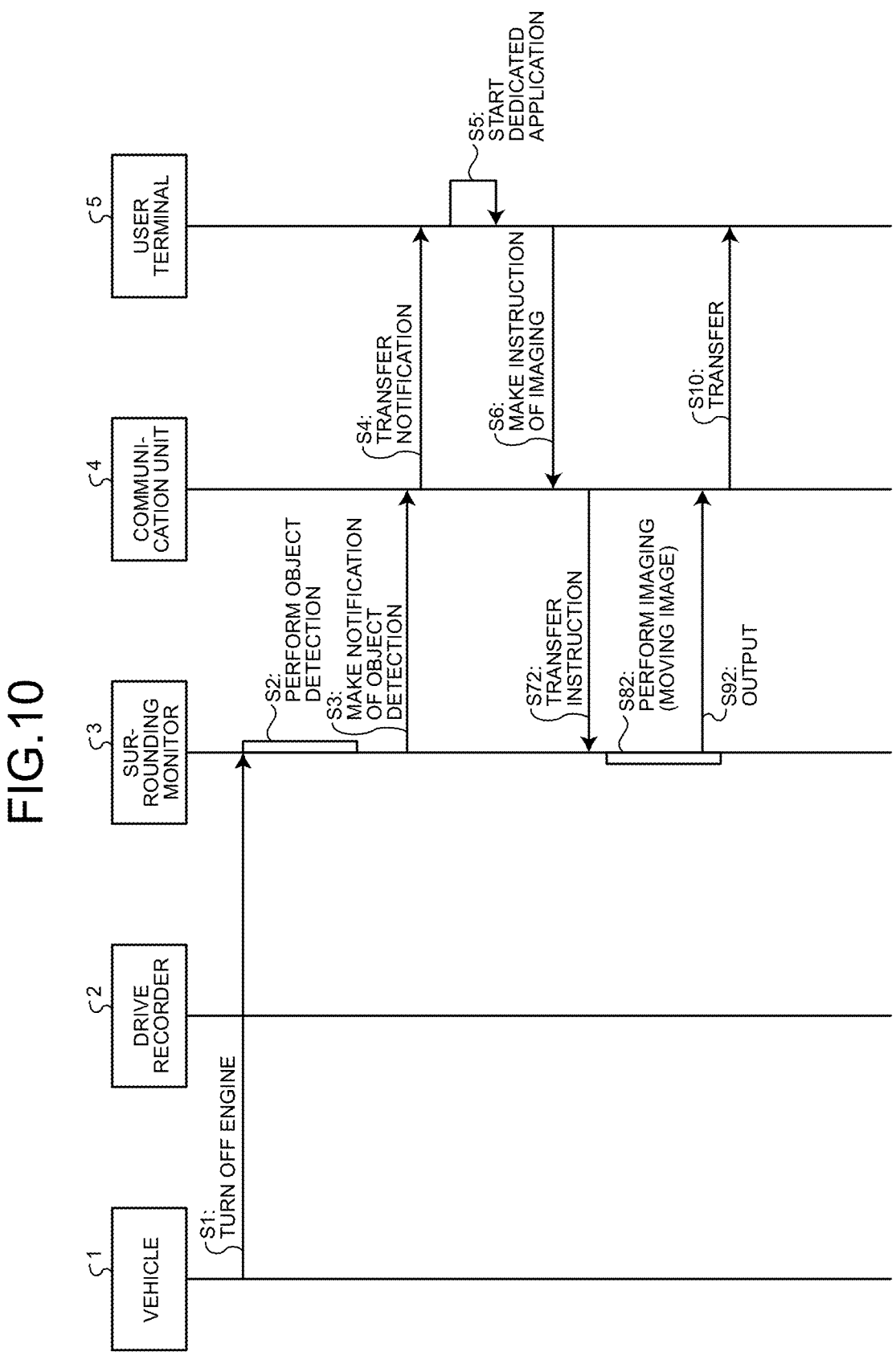
FIG. 10 is a sequence diagram illustrating an example of a flow of processing executed by the notification system.

FIG. 10 is a sequence diagram illustrating an example of a flow of processing executed by the notification system. Steps S1 to S6 and S10 are the same as those in the first embodiment.

Upon receiving an instruction from a user terminal 5 in step S6, a communication unit 4 transfers the instruction to a surrounding monitor 3 (step S72).

Upon receiving the above instruction, the surrounding monitor 3 starts imaging with at least some of cameras 371, 372, 381, and 382 (step S82). The camera to be operated is set in advance. In a default setting, recording is not performed at this timing.

The surrounding monitor 3 outputs video data output from the designated camera to the communication unit 4 (step S92). The subsequent processing is the same as that of the first embodiment.

According to the present embodiment, substantially the same effects as those of the first embodiment can be obtained.

Furthermore, according to the second embodiment, the cameras 371, 372, 381, and 382 for the surrounding monitor 3 are used not only for object detection but also for imaging after notifying the user terminal 5 of object detection. With such a configuration, it is not necessary to separately start the cameras 271 to 273 for imaging after notification. Therefore, it is possible to suppress the consumption of the remaining battery amount as compared with a case where other cameras 271 to 273 are started after the notification based on the outputs of the cameras 371, 372, 381, and 382.

As a result, it can be expected that the operation can be performed for a longer time as compared with the first embodiment.

Next, a third embodiment will be described with reference to FIG. 11. Since the third embodiment is a modified example of the first embodiment, the explanation of the same parts as those of the first embodiment is omitted and the same reference numerals will be used.

Figure 11:
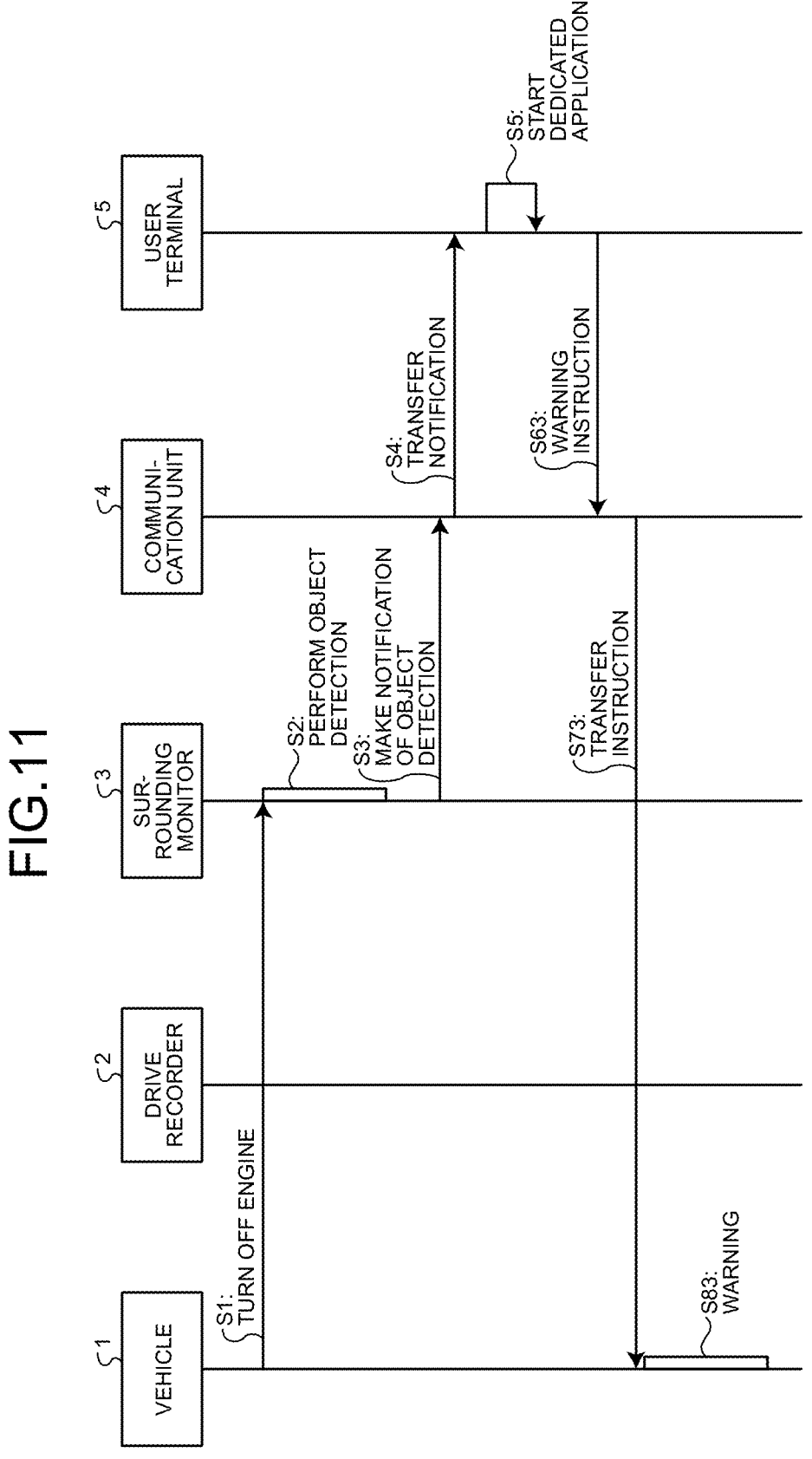
FIG. 11 is a sequence diagram illustrating an example of a flow of processing executed by the notification system.

FIG. 11 is a sequence diagram illustrating an example of a flow of processing executed by a notification system. Steps S1 to S5 are the same as those in the first embodiment.

In step S5, a user terminal 5 starts a dedicated application in response to a user operation on for a displayed notification. A control unit 50 that executes the dedicated application causes a display unit 55 to display a screen including details of a notification content and an operator for receiving various instructions from the user. Here, in the present embodiment, an operator for instructing execution of a warning is displayed on the display unit 55.

When an operation unit 56 receives an operation on the operator, the control unit 50 transmits a warning instruction to a communication unit 4 (step S63).

Upon receiving the warning instruction from the user terminal 5, the communication unit 4 transfers the warning instruction to a vehicle 1 (step S73).

Upon receiving the warning instruction, the vehicle 1 executes a warning action (step S83). The warning action aims at threatening for the purpose of crime prevention on the assumption that a person approaching the vehicle 1 who would have been detected by an object detection unit 301 has an intention to harm the vehicle 1, and examples thereof include the following.

(Example 1) Turning on a lighting device such as a headlight or an indoor light provided in the vehicle 1

(Example 2) Activating a horn included in the vehicle 1

(Example 3) Turning on a screen of an electronic mirror 15 or a display device 16

In executing the warning action described above, the vehicle 1 includes a control unit that integrally controls behaviors of the vehicle 1 including operations of the headlight, the indoor light, the horn, the electronic mirror 15, and the display device 16, and the control unit receives the warning instruction described above from the notification system. The warning action in (Example 3) can be executed via, for example, an MCU 21 of a drive recorder unit 2.

As described above, in the third embodiment, after a notification unit outputs the notification, the control unit receives, from an external device (user terminal 5), an instruction regarding the warning action for activating at least any a lighting, the horn, or the display device included in the vehicle 1, and executes the warning action according to the instruction. With such a notification system, security can be enhanced.

Next, a fourth embodiment will be described with reference to FIG. 12. Since the fourth embodiment is a modified example of the first embodiment, the explanation of the same parts as those of the first embodiment will be omitted and the same reference numerals will be used.

Figure 12:
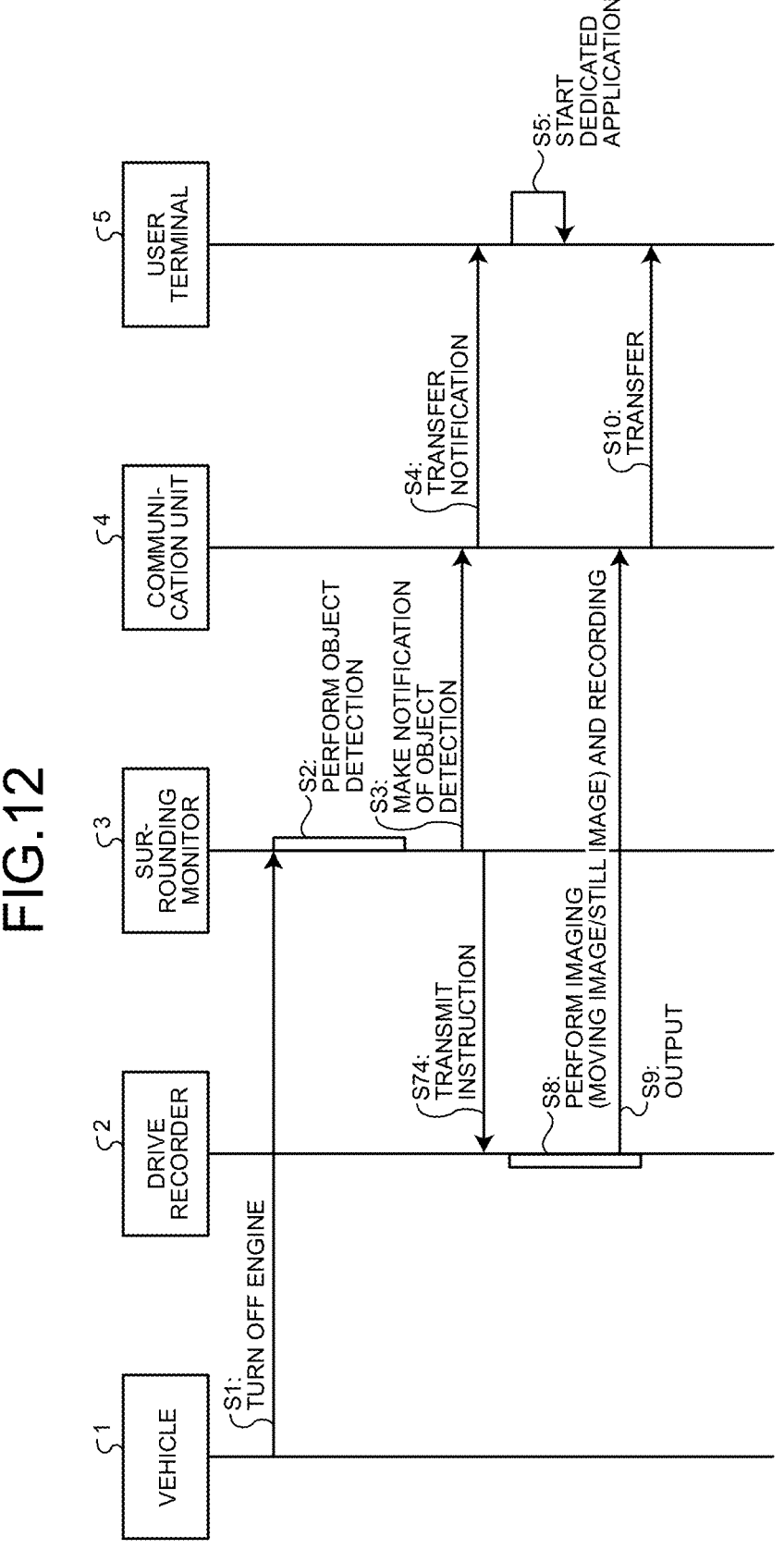
FIG. 12 is a sequence diagram illustrating an example of a flow of processing executed by the notification system.

FIG. 12 is a sequence diagram illustrating an example of a flow of processing executed by a notification system. In the present embodiment, steps S6 and S7 performed in the first embodiment are omitted, and an image output from an imaging unit (at least any of cameras 271 to 273) is transferred to a user terminal 5 while a notification is output in step S3.

That is, a surrounding monitor 3 outputs the notification in step S3, and transmits an instruct to perform imaging to a drive recorder unit 2 (step S74). In other words, the notification output unit 302 of the surrounding monitor 3 outputs, to the drive recorder unit 2, an imaging instruction to make an instruction to perform imaging by at least one camera, in response to an object being detected by the object detection unit 301. The subsequent processing is the same as that of the first embodiment.

Next, a fifth embodiment will be described with reference to FIG. 13. Since the fifth embodiment is a modified example of the second embodiment, the explanation of the same parts as those of the second embodiment will be omitted and the same reference numerals will be used.

Figure 13:
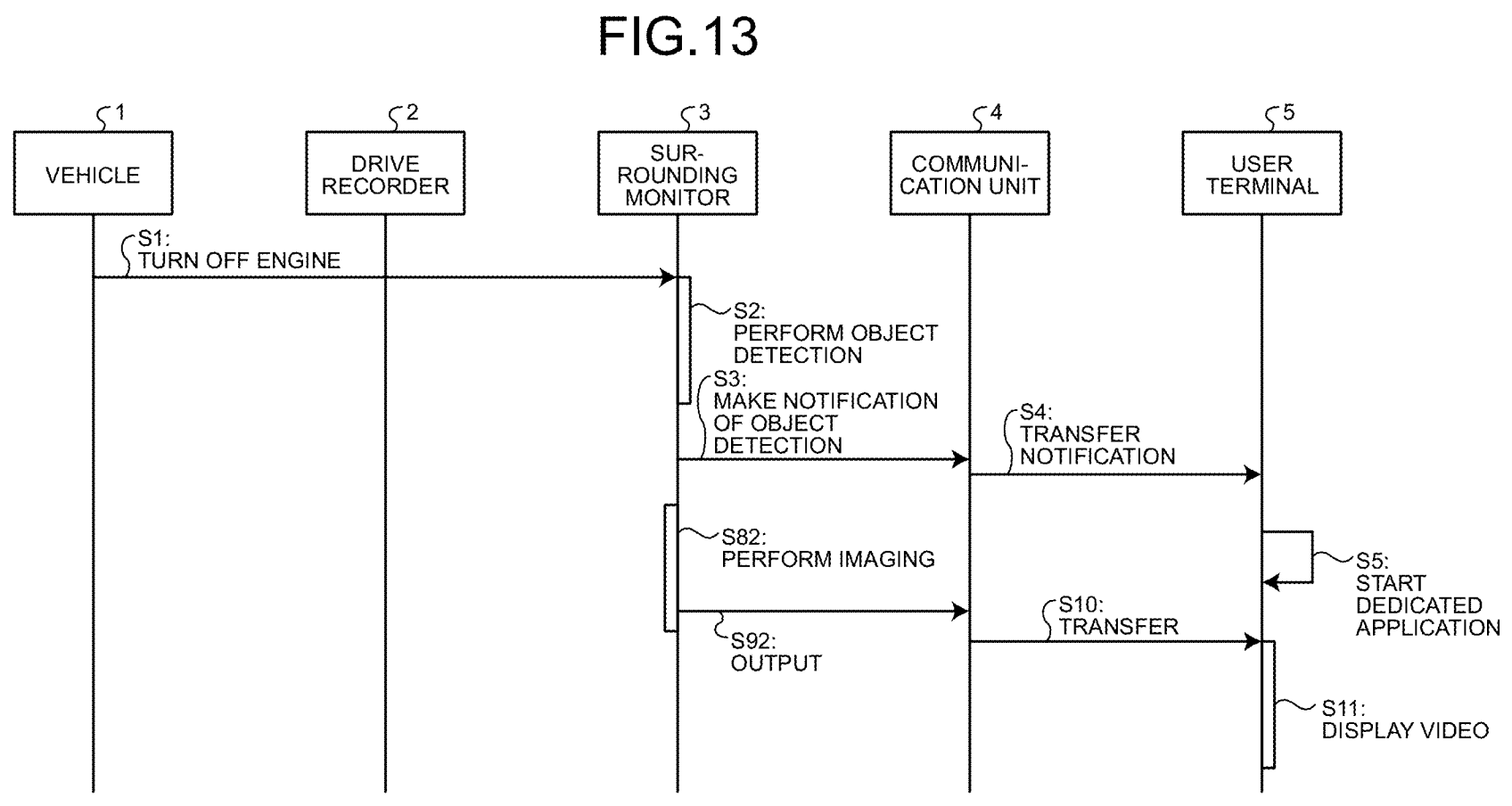

FIG. 13 is a sequence diagram illustrating an example of a flow of processing executed by a notification system. In the fifth embodiment, steps S6 and S72 performed in the second embodiment are omitted, and the surrounding monitor 3 start imaging by the imaging unit (at least any of the cameras 371, 372, 381, and 382) (step S82) while outputting the notification in step S3. In other words, the control unit 30 of the surrounding monitor 3 performs imaging by at least one camera, in response to an object being detected by the object detection unit 301. Then, the surrounding monitor 3 outputs video data output from the designated camera to the communication unit 4 (step S92). The video data output here is a real-time video. The subsequent processing is the same as that of the second embodiment. In the fifth embodiment, the output video data may be displayed in the user terminal 5 in real time.

According to the fourth embodiment and the fifth embodiment, the user can view a situation of the vehicle 1 at an earlier timing.

In the fourth embodiment and the fifth embodiment, steps S3 to S5 may be omitted. In other words, the notification system according to the fourth embodiment and the fifth embodiment may be an imaging system.

Next, a sixth embodiment will be described with reference to FIG. 14 and FIG. 15. Since the sixth embodiment is a modified example of the first embodiment, the explanation of the same parts as those of the first embodiment is omitted and the same reference numerals will be used.

Figure 14:
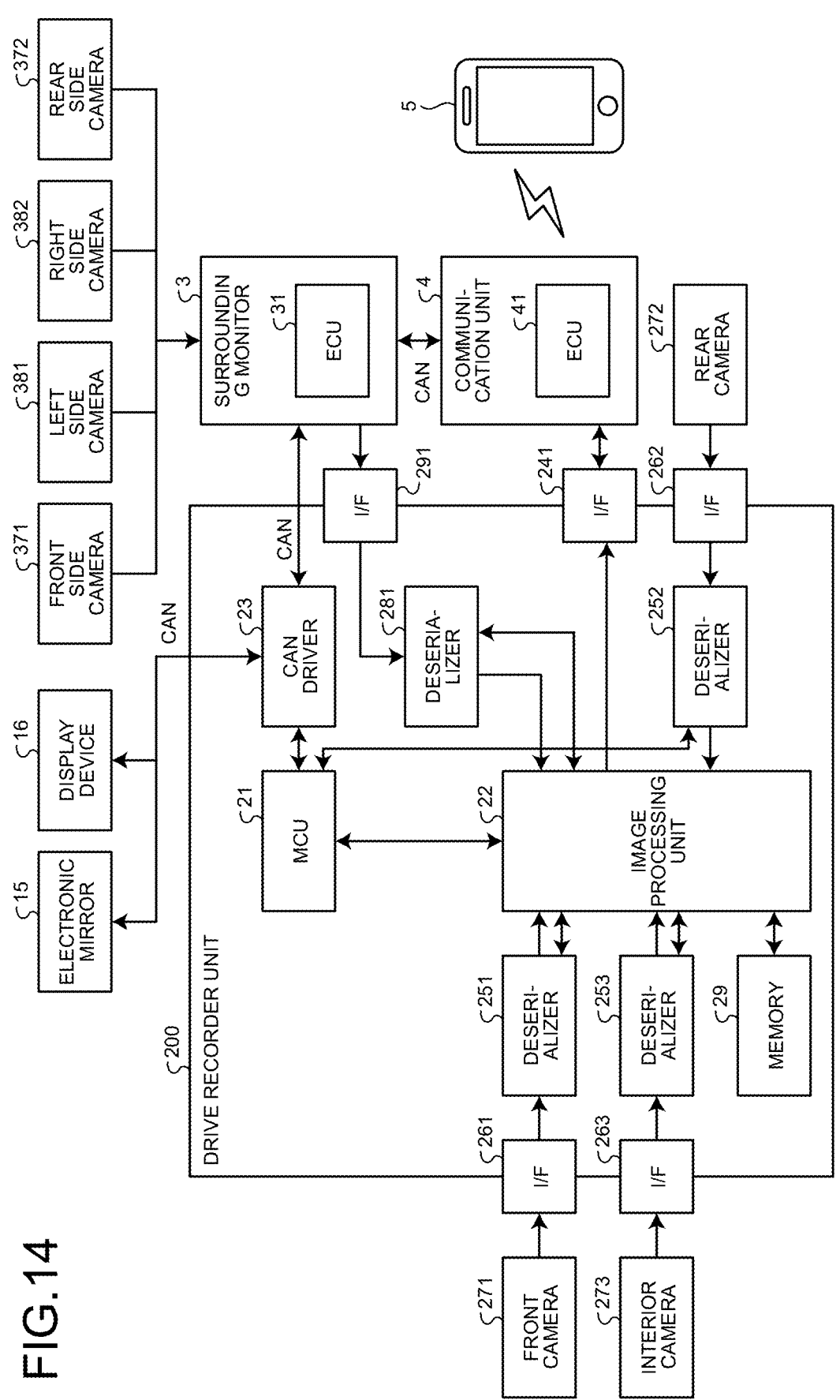
FIG. 14 is a block diagram illustrating an example of a configuration of a notification system according to an embodiment.
Figure 15:
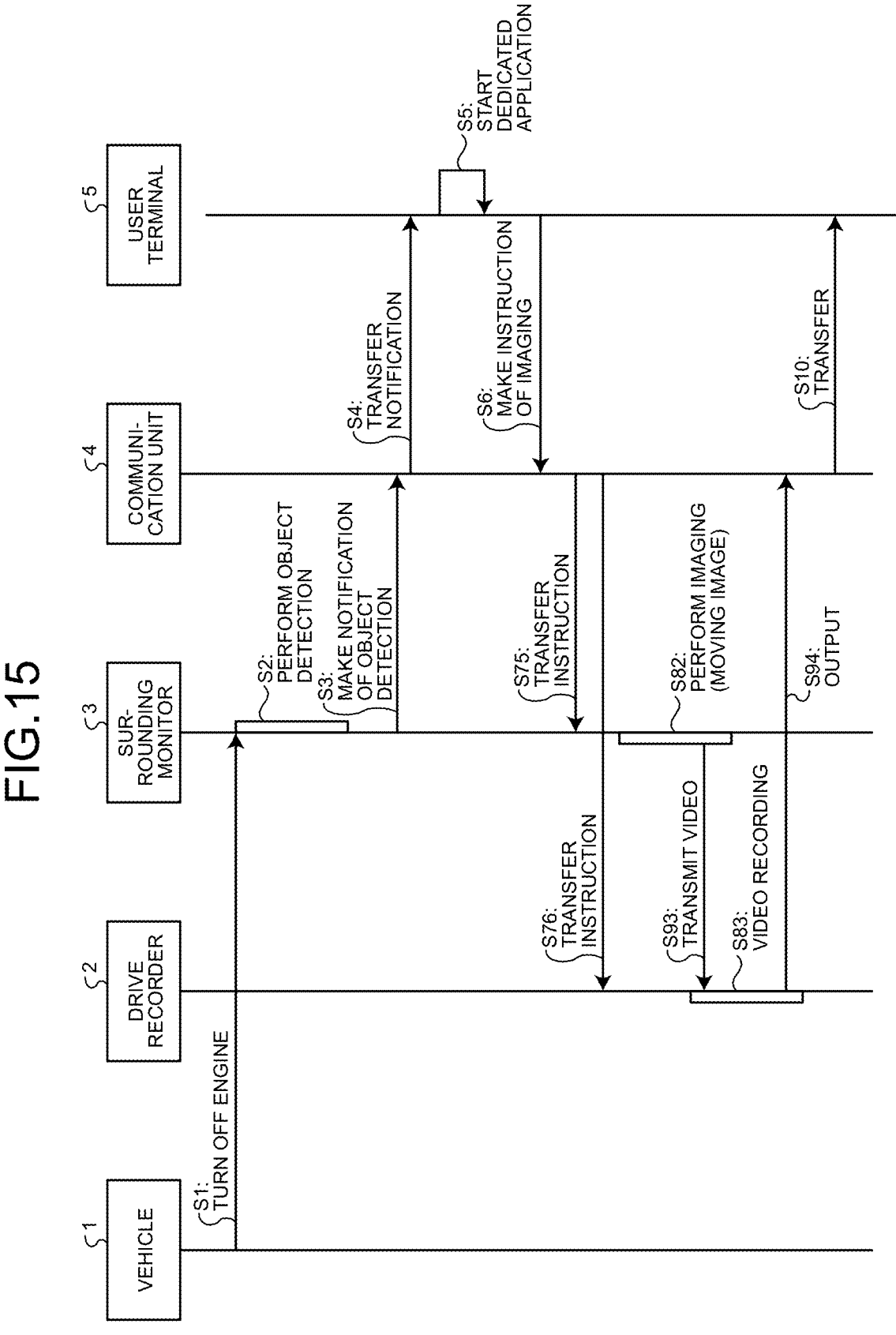
FIG. 15 is a sequence diagram illustrating an example of a flow of processing executed by the notification system.

FIG. 14 is a block diagram illustrating an example of a configuration of a notification system according to the sixth embodiment. The drive recorder unit 200 is different from the drive recorder unit 2 in the first embodiment in further including an interface (I/F) 291, and a deserializer 281.

The I/F 291 connects the surrounding monitor 3 and the deserializer 281, and mediates communication between the surrounding monitor 3 and the image processing unit 22.

Upon receiving a control signal from the image processing unit 22, the deserializer 281 receives a video transmitted from the surrounding monitor 3. At this time, the deserializer 281 converts the video transmitted as a serialized video signal into parallel data. Further, the deserializer 281 transmits the parallelized video as video signals to the image processing unit 22. The deserializer 281 is an example of the receiving unit.

In such a configuration, the notification system according to the sixth embodiment executes processing in the following exemplified flow. FIG. 15 is a sequence diagram illustrating an example of a flow of processing executed by the notification system. Steps S1 to S6 are the same as those in the first embodiment.

Upon receiving an instruction from the user terminal 5 in step S6, the communication unit 4 transfers the instruction to the surrounding monitor 3 (step S75). Further, the communication unit 4 transfers the instruction to the drive recorder unit 2 (step S76).

Upon receiving the above instruction, the surrounding monitor 3 starts imaging with at least some of cameras 371, 372, 381, and 382 (step S82).

The surrounding monitor 3 outputs video data output from the designated camera to the drive recorder unit 2 (step S93).

The drive recorder unit 2 records the video data received from the surrounding monitor 3 (step S83).

The drive recorder unit 2 outputs the video data received from the surrounding monitor 3 to the communication unit 4 (step S94). The drive recorder unit 2 may output the video data received from the surrounding monitor 3 to the communication unit 4 after completing the recording thereof, or perform the recording of the vide data and the outputting thereof to the communication unit 4 in parallel. The subsequent step S10 is the same as that of the first embodiment.

According to the sixth embodiment, substantially the same effects as those of the first embodiment can be obtained.

Further, according to the sixth embodiment, the cameras 371, 372, 381, and 382 for the surrounding monitor 3 are used not only for object detection but also for imaging after notifying the user terminal 5 of object detection. With this, substantially the same effects as those of the second embodiment can be obtained.

Furthermore, according to the sixth embodiment, the video imaged by the cameras 371, 372, 381, and 382 for the surrounding monitor 3 is recorded in the drive recorder unit 2. In the cameras 371, 372, 381, and 382 for the surrounding monitor 3, the imaging range is wide and the blind angle is small. Therefore, a situation of a person or the like approaching the vehicle 1 is more easily imaged.

In the sixth embodiment, the surrounding monitor 3 may transmit the video data output from the designated camera to the drive recorder unit 2 after receiving a start notification to make notification that the drive recorder unit 2 starts after transferring the instruction to the drive recorder unit 2 in step 76. Alternatively, the surrounding monitor 3 may transmit the video data output from the designated camera to the drive recorder unit 2 after a predetermined time elapsed after transferring the instruction to the drive recorder unit 2 in step 76.

Figure 16:
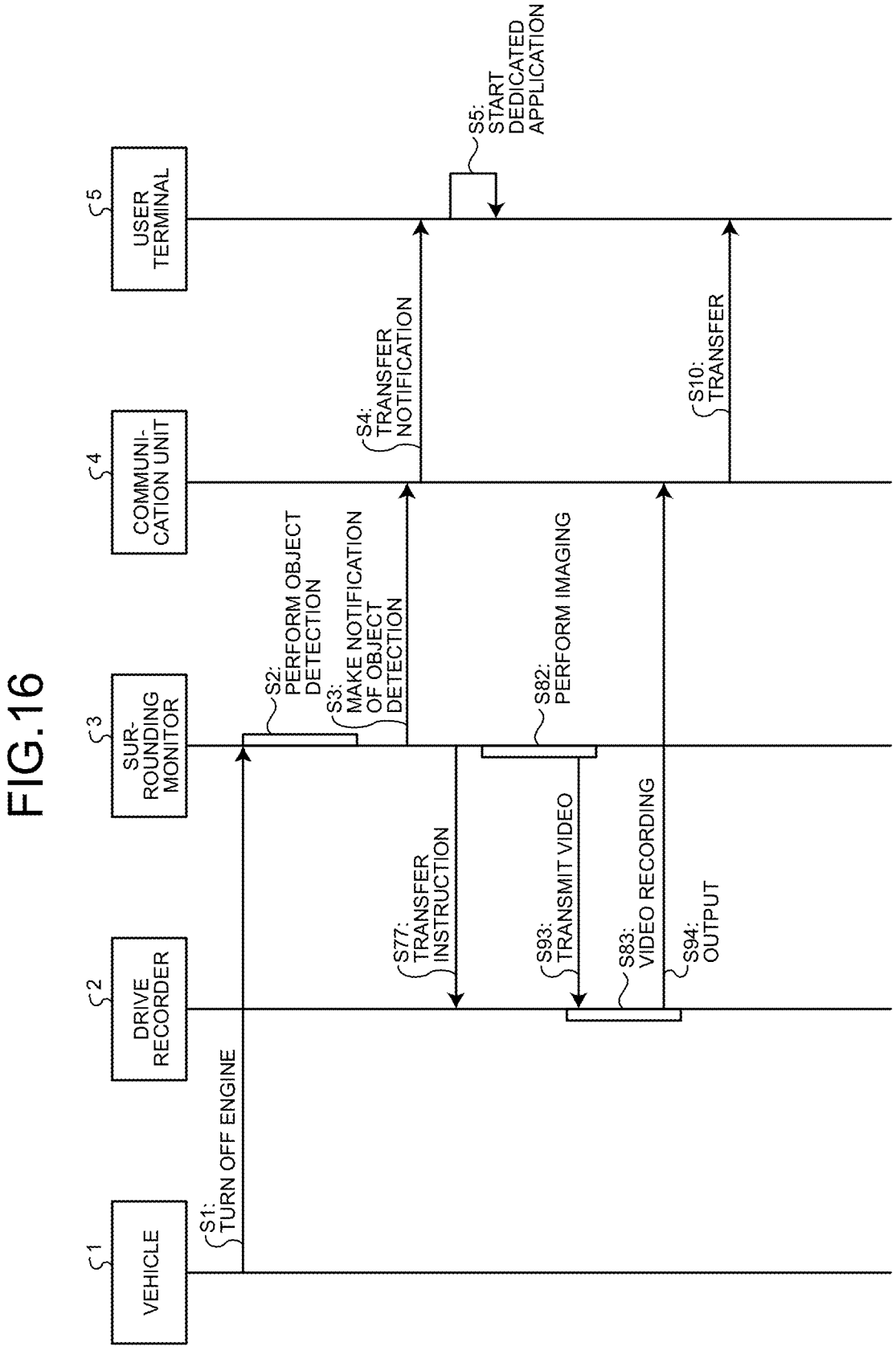
FIG. 16 is a sequence diagram illustrating an example of a flow of processing executed by the notification system.

Next, a seventh embodiment will be described with reference to FIG. 16. Since the seventh embodiment is a modified example of the sixth embodiment, the explanation of the same parts as those of the sixth embodiment is omitted and the same reference numerals will be used.

The notification system according to the seventh embodiment executes processing in the following exemplified flow. FIG. 16 is a sequence diagram illustrating an example of a flow of processing executed by the notification system. Steps S1 to S5 are the same as those in the first embodiment.

The surrounding monitor 3 transmits an instruction to output video to the drive recorder unit 2 (step S77) while outputting the detection notification in step S3.

The surrounding monitor 3 starts imaging by the imaging unit (at least any of cameras 371, 372, 381, and 382) (step S82). In other words, the control unit 30 of the surrounding monitor 3 performs imaging by at least one camera, in response to an object being detected by the object detection unit 301. The subsequent is the same as in the sixth embodiment.

According to the seventh embodiment, substantially the same effects as those of the sixth embodiment can be obtained. Further, according to the seventh embodiment, the user can view a situation of the vehicle 1 at earlier timing.

In the seventh embodiment, steps S3 to S5 may be omitted. In other words, the notification system according the seventh embodiment may be an imaging system.

With the imaging system according to the present disclosure, it is possible to enhance security of a vehicle.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An imaging system comprising:

at least one camera that outputs an image obtained by imaging at least a part of surroundings of a vehicle;

a first device including a first memory storing therein a first program, and a first processor coupled to the first memory;

a second device including a second memory storing therein a second program, and a second processor coupled to the second memory; and a third device including a third memory storing therein a third program, and a third processor coupled to the third memory, wherein the first processor is configured to execute the first program to perform first processing, the first processing includes:

detecting an object around the vehicle;

performing imaging to obtain image data by the at least one camera in response to detecting the object;

outputting a first instruction to make an instruction to perform second processing in response to detecting the object;

performing outputting the image data from the first device to the second device, outputting from a notification system, to the third device, detection notification corresponding to information to make a notification that an object has been detected in response to detecting the object, in a case where a predetermined time has elapsed from the outputted detection notification and no instruction has been received, the notification system enters a sleep state, the second processor is configured to execute the second program to perform third processing including the second processing, the third processor is configured to execute the third program to perform fourth processing, the fourth processing includes outputting an image received from the second device and output by the at least one camera, and when an operation is set in advance, in the case where the predetermined time has elapsed from the outputted detection notification and no instruction has been received, the notification system:

stores an image outputted from a camera of the at least one camera satisfying selection and designation of a detection range to be an object detection target of the first device set in advance or selection and designation of a camera of the at least one camera to be operated set in advance; or make the detection notification again.

2. The imaging system according to claim 1, wherein the first instruction includes an imaging instruction to make an instruction to perform imaging by the at least one camera and the second processing includes performing the imaging by the at least one camera according to the imaging instruction.

3. The imaging system according to claim 2, wherein the third processing includes outputting the image output by the at least one camera to the third device.

4. The imaging system according to claim 2, wherein the at least one camera includes at least one of a front camera that images an area in front of the vehicle, a rear camera that images an area in a rear of the vehicle, and an interior camera that images an interior of the vehicle.

5. The imaging system according to claim 1, wherein the first instruction includes an outputting instruction to make an instruction to perform outputting the image data and the second processing includes performing the outputting the image data to the third device according to the outputting instruction.

6. The imaging system according to claim 1, wherein the third processing includes performing recording the image data.

7. The imaging system according to claim 5, wherein the at least one camera includes a downward imaging camera that images an area below an attachment position thereof.

8. The imaging system according to claim 1, wherein the fourth processing includes outputting the detection notification to an external device.

9. The imaging system according to claim 1, wherein the first device is a surrounding monitor, the second device is a drive recorder and the third device is a communication device mounted on the vehicle.

10. The display device according to claim 1, wherein the at least one camera includes a front camera that images an area in front of the vehicle and below an attachment position of the front camera, a rear camera that images an area in a rear of the vehicle and below an attachment position of the rear camera, a right side camera that images an area in a right side of the vehicle and below an attachment position of the right side camera, and a left side camera that images an area in a left side of the vehicle and below an attachment position of the left side camera.

* * * * *